Feb. 1, 1966  F. V. OGLE  3,232,210
APPARATUS FOR PRODUCING SMOKED FOOD PRODUCTS
Filed Nov. 13, 1961  2 Sheets-Sheet 1

INVENTOR
FLOYD V. OGLE
BY
Alfred R. Fuchs
ATTORNEY

Feb. 1, 1966  F. V. OGLE  3,232,210
APPARATUS FOR PRODUCING SMOKED FOOD PRODUCTS
Filed Nov. 13, 1961  2 Sheets-Sheet 2

INVENTOR.
FLOYD V. OGLE
BY Alfred R. Fuchs
ATTORNEY

United States Patent Office 3,232,210
Patented Feb. 1, 1966

3,232,210
APPARATUS FOR PRODUCING SMOKED
FOOD PRODUCTS
Floyd V. Ogle, Raytown, Mo.
(6711 Harvard Ave., Kansas City 33, Mo.)
Filed Nov. 13, 1961, Ser. No. 151,668
9 Claims. (Cl. 99—259)

My invention relates to apparatus for producing smoked food products, and more particularly to an apparatus for smoking liquid or semi-liquid food products all of which might be said to be of a mobile character.

While hickory or other wood smoke flavor has been imparted to food products, prior to the present invention, this flavor has always been provided, where smoke was directly used for imparting the flavor, in the production of such smoke flavored foods as meat, poultry or fish, or other solid foods that could be placed on grates, trays, spits, belts, skewers, rotisseries, or wire or perforated metal baskets, for the purpose of suspension in the smoke, thereby allowing the smoke to circulate up and around such solid type food. This provides an outer zone, that is smoke flavored, with no or very slight penetration of smoke into the solid bulk of the meat or other similar solid food product. Such a method has not been adaptable to the smoking of foods that are of a fluid or semi-fluid character or are mobile in their characteristics.

In order to obtain some approximation of a smoke flavor in such semi-fluid or fluid foods, which might be referred to as being mobile food products, smoked salt or "liquid smoke," has been used for this purpose. Such smoke flavored liquid and smoked salt do not impart the true wood smoke flavor that can be obtained by direct contact with the smoke produced by hickory wood chips or other wood chips of desired character with the product that is to have the smoke flavor applied thereto. It is a purpose of my invention to provide a suitable apparatus for applying the smoke produced by such wood chips into direct contact with a food product that is of a mobile nature so that the flavor of the smoke will be imparted to the entire mass of the food product, or in other words, throughout its mass.

My improved method, carried out by means of my improved apparatus, imparts a true hickory or other wood smoke flavor to fluid or semi-fluid or soft type foods such as soup, sauces, catsup, chilli, beans, whole kernel corn, and many other woods of a similar character. To accomplish this, the mobile or soft type food is lifted from a body of mass thereof, that is contained in an open top vessel, into the area in which the smoke is collected, which might be referred to as the smoke cloud, and poured from an elevated position above the mass of the food product, downwardly through the smoke cloud, means being provided to slow down the travel of the food product in a downward direction, due to the action of gravity, so as to maintain it in contact with the smoke for as long a period as is possible.

In the apparatus I have provided for carrying out my improved method of smoking such mobile food products, portions of the food product are repeatably removed from the mass thereof, that is in the vessel or other container, elevated into the smoke cloud and returned by pouring in the above referred to manner, from an elevated position back into the mass of said food product. Thus, portions of the mass of food are repeatably removed from the main mass, contacted closely with the smoke in the smoke cloud, and returned to the main mass, the result being that after a sufficient number of such contacts of portions of the mass of food with the smoke directly, the smoke flavor is distributed in, or permeates, the entire mass of the mobile food product so that it has the same intensity of smoke flavor throughout.

It is a purpose of my invention to provide, in combination with smoke producing means, means for subjecting a mobile food product to close contact with smoke produced by the smoke producing means, comprising an open topped vessel adapted to contain a mass of said food product, said vessel being mounted over the smoke producing means in a position such that the smoke produced thereby will flow around and above said vessel, and to provide means for elevating portions of the mass from said vessel into a position above the vessel and discharging those portions from the elevating means to fall through the smoke cloud above said vessel into said vessel to rejoin the mass of food in the vessel.

More specifically my invention comprises an apparatus of the above referred to character that is provided with a plurality of open topped dippers mounted for travel into and out of the vessel, to pick up portions of the mass of food contained in the vessel, and elevate it into a position in upwardly spaced relation to the vessel, and means for moving the dippers continuously in a path between a position in which the dippers are in the vessel adjacent the bottom thereof and a position in which the contents of the dippers are discharged or poured out of the same downwardly through the smoke cloud into the mass that is contained in the vessel. Preferrably the dippers are mounted so that the same travel in a circular path by being mounted on arms that extend radially from an axis about which the apparatus is rotated, by means of a suitable shaft that is driven, in any suitable manner, in a continuous direction, the continuous rotation of the plurality of dippers producing a constant flow of the food products pouring through the smoke area or smoke cloud, to bring the food products into close contact with the smoke.

Still more specifically, my apparatus for smoking a mobile food product preferably comprises a grid, smoke producing means under the grid, an open topped vessel mounted over the grid, a plurality of open topped dippers mounted for travel into and out of the vessel, between a position adjacent the bottom thereof and a dumping position in upwardly spaced relation to the vessel, and means for moving the dippers between the two positions thereof, together with means for slowing the downward movement of the stream of food toward the mass in the vessel, comprising baffles mounted above the vessel in a position between the dumping position of the dippers and the vessel.

More specifically, my improved apparatus for smoking such a mobile food product, preferably, comprises an open topped vessel that is mounted in a position above a grid of a grill or a similar smoke producing means, which vessel is mounted on the shaft of a spit, or similar apparatus, that is provided with either manual or power driven means for rotating the same constantly in the same direction. The mounting of the open topped vessel preferably includes means engaged with the shaft so as to space the curved bottom of the open topped vessel a suitable distance from the shaft for a purpose to be explained below, and legs that are adjustable, that extend downwardly from the vessel and engage with the grid to support the vessel against any rocking motion about the shaft.

My apparatus further comprises means for mounting the dippers on the shaft, above referred to, which is driven in a suitable manner, comprising a hollow shaft, from which arms extend radially, on the outer ends of which the dippers are mounted, so that the dippers will travel about the axis of the shaft in a circular path, the bottom wall of the vessel being curved on an arc substantially about the axis of the shaft as a center, so that the dippers will follow the curved bottom of the vessel, in their movement in closely spaced parallel relation thereto. In order to provide means for slowing down the dropping or pouring stream of the food products from the dippers as the dippers reach their elevated dumping position, baffle means is provided in the form of baffle plates that are mounted to extend radially from the shaft and which alternate around the shaft with the arms so that there is a baffle between each pair of arms carrying the dippers.

Other objects and advantages of my invention will appear as the description of the drawings proceeds. I desire to have it understood, however, that I do not intend to limit myself to the particular details shown or described, except as defined by the claims.

Figure 1:
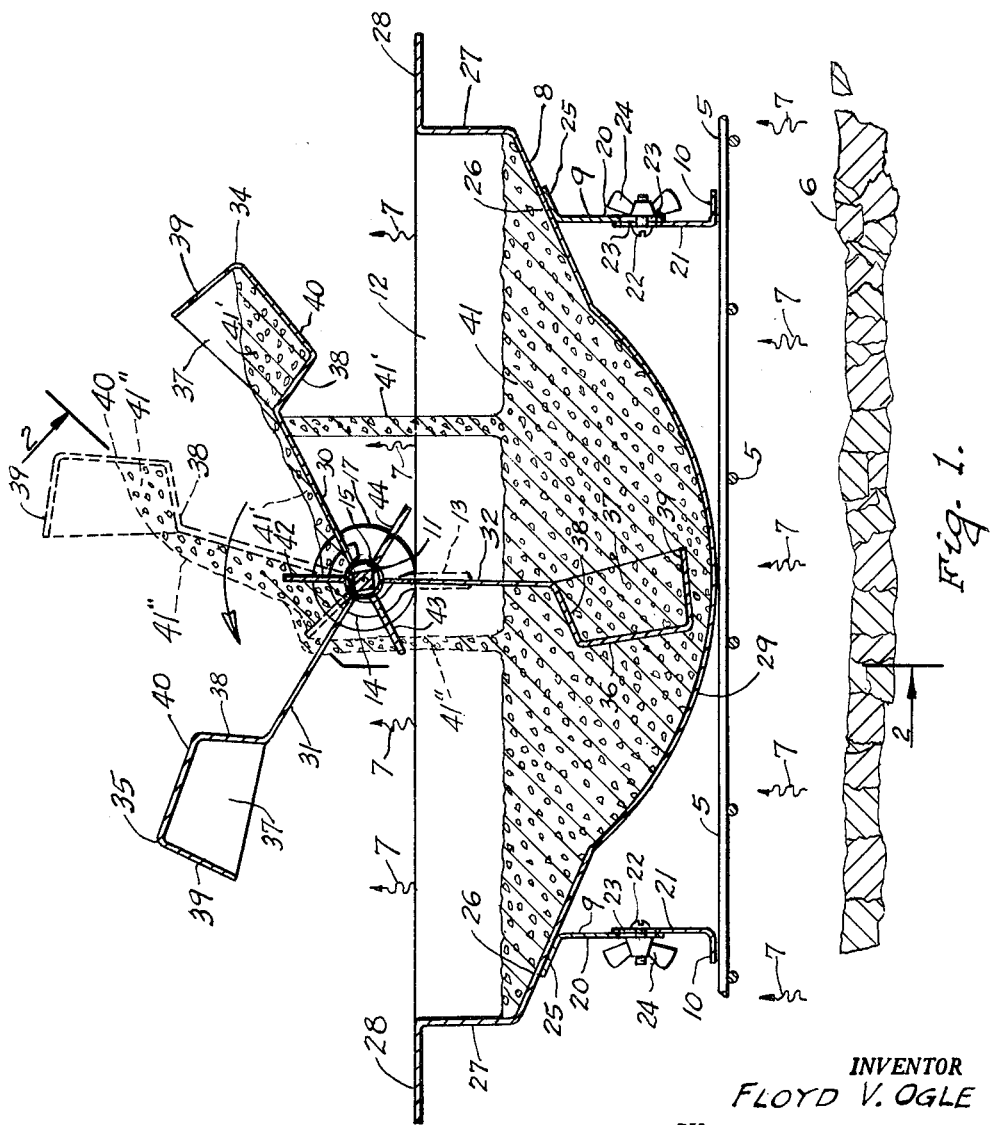
FIG. 1 is a vertical sectional view through may improved apparatus, a fragmentary portion of the smoke producing means being shown.
Figure 2:
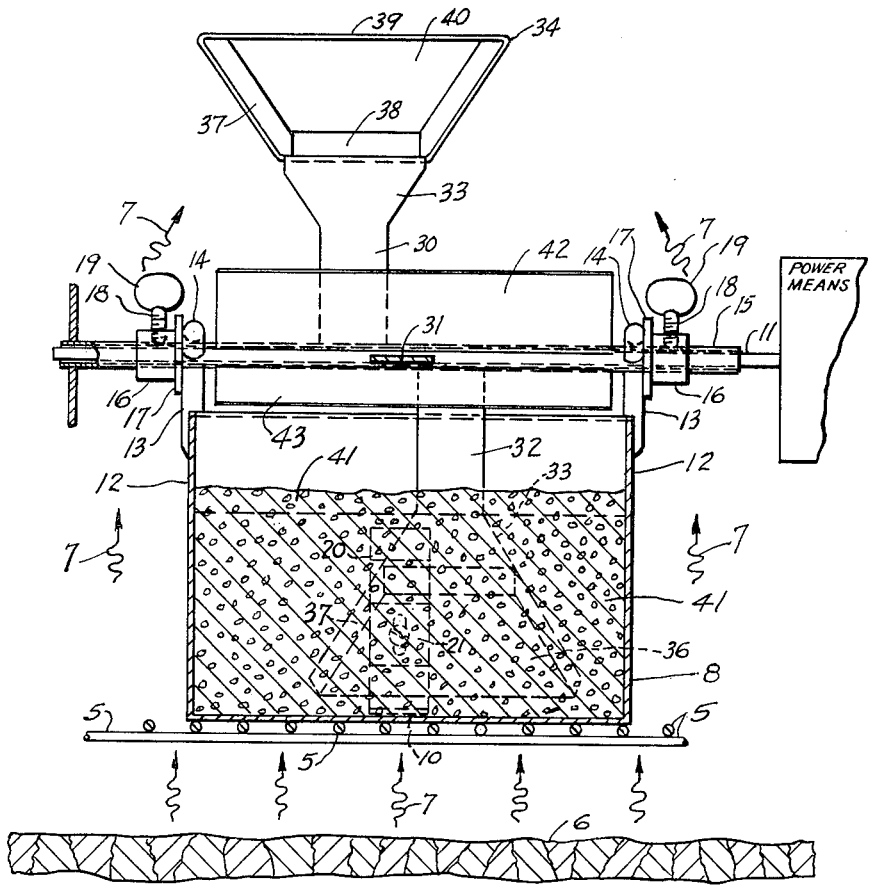
FIG. 2 is a section taken on the line 2—2 of FIG. 1.
Figure 4:
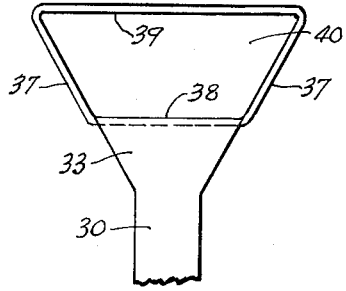
FIG. 4 is a fragmentary plan view showing one of the dippers and a portion of the arm upon which it is mounted.
Figure 3:
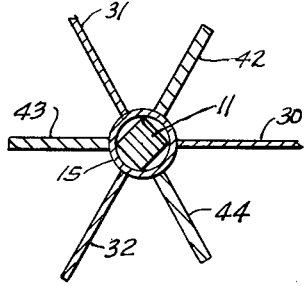
FIG. 3 is a fragmentary enlarged sectional view through the shaft and adjoining parts.

Referring in detail to the drawings, my improved apparatus for producing a smoke flavored mobile food product, is shown in FIGS. 1 and 2 as being mounted on a grid 5, which is part of a grill or similar apparatus that is provided with suitable material 6 for producing smoke and heat, ordinarily comprising charcoal and wood chips, sawdust, or other smoke producing particles, intermingled with the fuel, such as charcoal. The smoke traveling upwardly from the smoke producing means is indicated in the drawing by the arrows 7.

Mounted on the grid is a vessel 8 which is preferably open topped, and which is provided with legs 9 that have foot portions 10 that are in engagement with the grid 5 for supporting the vessel 8 against rocking movement on the grid 5. The apparatus that I disclose in the drawings is shown as being provided with a square shaft 11, such as commonly provided on grills, for mounting a product that is to be roasted or otherwise cooked, in position over the grill so that it can be turned about the axis of the shaft to present the various surfaces thereof to the heat of the grill. Any suitable means can be provided for rotating the shaft in a predetermined direction. Such means can be either suitable power means, such as the motor 4 with built in reduction gearing commonly provided for grills of this character or manually operated means. The shaft 11 has a predetermined spaced relation to the grid 5, which spacing may be adjustable.

The container 8 is provided with side walls 12 that are provided with upwardly extending arms 13 that have hook portions 14 at the upper ends thereof that engage with a hollow shaft 15 that is mounted on the shaft 11, the purpose of this mounting being to position the vessel bottom, as will be explained below, properly with relation to the dippers, to be described below. Mounted on the shaft 15 are collars 16 that are provided with flanges 17, said collars being fixed to the hollow shaft 15 in any desired manner, as by welding. The flanges 17 are positioned so as to engage with the hook brackets 13 so as to located the vessel 8 with respect to the shaft 15 lengthwise thereof. The shaft 15 along with the collars 16, is secured to the shaft 11 for rotation therewith by means of set screws 18 extending through screw-threaded openings in collars 16 and aligning openings in the shaft 15 and engaging the shaft 11, said set screws being provided with thumb pieces 19 for operating the same. The legs 9 are preferably made up of an upper portion 20, which is slotted, and a lower portion 21, which has a clamping screw 22 mounted thereon to extend through the slot 23 of the upper leg portion 20, a wing nut 24 being provided for securing the two leg portions in clamped adjusted position. The upper leg portion is provided with an inclined portion 25, which is secured in fixed position, as by brazing or welding, to the sloping bottom wall portion 26 of the vessel 8.

The open topped vessel 8 is provided with vertical wall portions 27 that extend from inclined wall portions 26 to outwardly directed end flanges 28, and with a cylindrically curved bottom wall 29 extending between the inclined wall portions 26. Preferably the spacing of the shaft 11 from the grid 5 is such with respect to the size of the vessel and the length of the hook arms 13 that when the legs 9 are adjusted so that the curved bottom 29 engages the grid 5 the upper curved portions of the hooks 14 are in engagement with the upper curved surface of the hollow shaft 15.

Extending radially from the hollow shaft 15 in fixed position are arms 30, 31 and 32, said arms being arranged around the shaft at 120 degrees to each other, and being arranged progressively lengthwise of said shaft in overlapping relation, as will be obvious from FIG. 2. Each of said arms is provided with a widening portion 33, which joins the main body portion of the arm with an integral cup portion, the cup portion on the arm 30 being indicated by the numeral 34, that on the arm 31 by the numeral 35 and that on the arm 32 by the numeral 36. The cup members 34, 35 and 36 are duplicates, being provided with side walls 37 that diverge from the inner end wall 38 thereof toward the outer end wall 39 thereof, thus providing a wide end wall 39 and a relatively narrow end wall 38 on each of the cup members, said walls 37, 38 and 39 diverging or inclining outwardly between the bottom wall 40 and the top edges of said side walls.

The length of the arms 31 and 32 is such that the cups 34, 35 and 36, which constitute dippers, will travel closely adjacent the curved wall 29 of the bottom portion of the open topped vessel 8 throughout the said curved bottom portion as the shaft 15 is rotated, the direction of rotation being in a counter-clockwise direction. It will also be evident that, due to the overlapping arrangement of the arms 30, 31 and 32 lengthwise of the shaft 15 and their progressive arrangement thereof lengthwise of the shaft, the wide top edges of the wall 39 will be moving closely adjacent the curved bottom 29 during such rotation and that, collectively, these wide edges of said walls 39 will engage with the contents of the vessel 8 over the major portion of the width thereof between the side walls 12 during each complete revolution of the shaft 15. As the dippers 34, 35 and 36 leave the body of food product 41 contained in the open topped vessel 8 in traveling between the position for the dipper 36 shown in FIG. 1 to the full line position of the dipper 34 shown in FIG. 1, the dipper will be substantially completely filled with a portion of the food product 41. As soon as the dipper, that has been so filled, passes the horizontal position thereof, in which the top edges of the side walls 37 are horizontal, the contents of the dipper will begin to be discharged over the inner wall 38 thereof. This discharge will continue and will increase in speed as the dipper travels to the dotted line position shown for one of said dippers in FIG. 1. The contents of the dipper in said dotted line position being largely discharged when this position is reached, although some discharge will occur, depending on the viscosity of the material, after the dipper has moved from the dotted line position to the full line position for the dipper 35, all of the portion of the food product 41 that was removed having been discharged by the time the position shown for the dipper 35 has been reached. The portion of the food product that is in the dipper 34 in the position shown in FIG. 1 is indicated by the numeral 41′ and the discharge of the food product in downwardly traveling streams thereof as it is poured by the dippers, is indicated by the numerals 41″, in FIG. 1.

Extending radially from the shaft 15 so as to bisect the angles between the arms 30, 31 and 32, are the baffle plates 42, 43 and 44. Said baffle plates, as will be obvious from FIG. 2, extend substantially the full width of the vessel 8, being spaced only sufficiently from the side walls 12 thereof that said side walls will be amply clear of the end edges of said baffle plates, said baffle plates being rectangular in character, and extending sufficiently radially from the shaft 15 to be in the path of the food product discharge from the cups or dippers 34, 35 and 36 as they move through the upper half of their circular path of travel about the shaft 15. The baffle plates 42, 43 and 44 thus act as retarding means for slowing down the pouring stream of the food product to expose it for a greater length of time to the smoke than would be the case if the food product were permitted to fall freely from the dippers into the main body portion or mass thereof in the open topped vessel 8.

In the carrying out of my improved method by means of the above described apparatus, the open topped vessel 8 containing the food product 41 is placed in position on the grill provided with the grid 5, which is provided with the fuel 6 that is in an incandescent condition for creating heat, and the smoke which is rising therefrom, which is produced by means of suitable wood particles that have been placed in the fuel body. The contents 41 of the open topped vessel 8 are thus subjected to heat and the smoke rises around the sides and ends of the vessel 8 and collects around and above the same in an area that extends a considerable distance above the top edge of the open topped vessel 8, thus providing what may be referred to as a smoke cloud vertically above the vessel 8.

The dippers 34, 35 and 36, in their rotation, each will travel along through the body of food product 41 to pick up a portion 41' thereof and carry it upwardly into the smoke cloud to discharge it into the smoke cloud so that it is dumped or poured from the dipper in which it was contained and travels by gravity downwardly toward the main body 41 of the food product in close contact with the smoke that is in the area through which the stream passes. There are, due to the provision of the arms on which the cup-like members 34, 35 and 36 are mounted and the baffles 42, 43 and 44, a plurality of streams of the food product traveling downwardly simultaneously from the cup-like members 34, 35 and 36 as these cup-like members or dippers are passing from a full line position to a completely empty position in the smoke cloud. The shaft 11 is continuously rotated in a given direction, that indicated by the arrow in FIG. 1, and accordingly the dippers 34, 35 and 36 will be repeatedly filled with portions 41' of the food product and discharged in the streams 41" through the smoke cloud. Thus the smoke will come in close contact with all portions of the food product 41, as, in the continued rotation of the shaft, the dippers will eventually extract all of the food product in small portions from the main body portion and return it to the main body portion in the vessel 8, thus causing the smoke to permeate the entire mass of the food product so treated. Thus any food product that is difficult to contact with smoke because of its mobile character, such as the food products hereinbefore mentioned, can be subjected to flavoring smoke by direct contact therewith so as to completely permeate the entire mass of said food product and to get a uniform smoke flavor of the desired character. Obviously the intensity of the smoke flavor can be varied as may be found desirable by varying the length of time that the apparatus is operated to subject the food product to contact with the smoke.

What I claim is:

1. Apparatus for smoking a mobile food product comprising a grid, smoke producing means under said grid, a shaft mounted to extend horizontally in upwardly spaced relation to said grid, an open topped vessel mounted between said shaft and grid, a plurality of arms extending radially from said shaft, an open topped cupped dipper mounted on the outer end of each of said arms, said dipper extending endwise of said arm substantially radially of said shaft means for rotating said shaft about said axis, and baffle plates mounted about said shaft in alternating relation to said arms 2. Apparatus for smoking a mobile food product comprising a grid, smoke producing means under said grid, a shaft mounted to extend horizontally in upwardly spaced relation to said grid, an open topped vessel mounted between said shaft and grid, bearings for said shaft extending upwardly from said vessel, supporting means for said vessel extending between said grid and said vessel, a plurality of cupped dippers mounted on said shaft in spaced relation therefrom to extend substantially radially thereto and rotate about the axis of said shaft, means for rotating said shaft about said axis, and radially extending baffle plates mounted about said shaft to extend outwardly therefrom in alternating relation to said dippers.

3. Apparatus for smoking a mobile food product comprising a grid, smoke producing means under said grid, a shaft mounted to extend horizontally in upwardly spaced relation to said grid, an open topped vessel mounted between said shaft and grid, bearings for said shaft extending upwardly from said vessel, legs adjustable in length on said vessel and engaging said grid, a plurality of cupped dippers mounted on said shaft in spaced relation therefrom to extend substantially radially thereto and rotate about the axis of said shaft, means for rotating said shaft about said axis, and baffles mounted about said shaft to extend outwardly therefrom in alternating relation to said dippers.

4. Apparatus for smoking a mobile food product comprising a grid, smoke producing means under said grid, a shaft mounted to extend horizontally in upwardly spaced relation to said grid, an open topped vessel mounted between said shaft and grid, a plurality of arms extending radially from said shaft, an open topped dipper mounted on the outer end of each of said arms, said dipper extending endwise of said arm substantially radially of said shaft, said arms being arranged progressively lengthwise of said shaft in overlapping relation, means for rotating said shaft about said axis, and baffle plates mounted about said shaft in alternating relation to said arms.

5. Apparatus for smoking a mobile food product comprising a grid, smoke producing means under said grid, a shaft mounted to extend horizontally in upwardly spaced relation to said grid, an open topped vessel mounted between said shaft and grid, a plurality of dippers mounted on said shaft to rotate about the axis of said shaft, means for rotating said shaft about said axis, and radially extending baffle plates on said shaft elongated lengthwise of said shaft and alternating with said dippers.

6. Apparatus for smoking a mobile food product comprising a grid, smoke producing means under said grid, a shaft mounted to extend horizontally in upwardly spaced relation to said grid, an open topped vessel mounted between said shaft and grid, bearings for said shaft extending upwardly from said vessel, legs adjustable in length on said vessel and engaging said grid, a plurality of arms extending radially from said shaft, an open topped dipper mounted on the outer end of each of said arms, said dipper extending endwise of said arm substantially radially of said shaft means for rotating said shaft about said axis and radially extending baffle plates on said shaft alternating with said arms.

7. Apparatus for smoking a mobile food product comprising a grid, smoke producing means under said grid, a shaft mounted to extend horizontally in upwardly spaced relation to said grid, an open topped vessel mounted between said shaft and grid, a plurality of flat faced arms extending radially from said shaft with the flat faces thereof extending parallel to the axis of said shaft, an open topped cupped dipper mounted on the outer end of each of said arms, said dippers having body portions extending endwise of said arms and offset from said arms to locate said body portions principally on one side of the plane of each of said arms, and means for rotating said shaft about said axis.

8. Apparatus for smoking a mobile food product comprising a grid, smoke producing means under said grid, a shaft mounted to extend horizontally in upwardly spaced relation to said grid, an open topped vessel mounted between said shaft and grid, a plurality of flat faced arms extending radially from said shaft with the flat faces thereof extending parallel to the axis of said shaft, an open topped cupped dipper mounted on the outer end of each of said arms, said dippers having body portions extending endwise of said arms and offset from said arms to locate said body portions principally on one side of the plane of each of said arms, and means for rotating said shaft about said axis, said body portions of said dippers tapering toward said arms and having straight outer top edges extending perpendicularly to the radial.

9. Apparatus for smoking a mobile food product comprising a grid, smoke producing means under said grid, a shaft mounted to extend horizontally in upwardly spaced relation to said grid, an open topped vessel cylindrically curved about the axis of said shaft mounted between said shaft and grid, a plurality of flat faced arms extending radially from said shaft with the flat faces thereof extending parallel to the axis of said shaft, an open topped cupped dipper mounted on the outer end of each of said arms, said dippers having body portions extending endwise of said arms and offset from said arms to locate said body portions principally on one side of the plane of each of said arms, and means for rotating said shaft about said axis, said body portions of said dippers tapering toward said arms and having straight outer top edges extending perpendicularly to the radial.

References Cited by the Examiner
UNITED STATES PATENTS

| | | | |
|---|---|---|---|
| 53,361 | 3/1866 | Thompson | 261—92 X |
| 839,158 | 12/1906 | Kope | 126—25 X |
| 1,228,855 | 6/1917 | Waern | 159—10 |
| 1,402,203 | 1/1922 | Alsop | 99—229 |
| 1,775,036 | 9/1930 | Dunning | 261—92 |
| 1,952,968 | 3/1934 | Brand | 99—261 |
| 1,964,372 | 6/1934 | Tygart. | |
| 2,312,339 | 3/1943 | Jones | 99—259 |
| 2,380,428 | 7/1945 | Gilliam | 99—259 |
| 2,464,614 | 3/1949 | Sala | 99—229 |

WALTER A. SCHELL, *Primary Examiner.*

NORTON ANSHER, JOSEPH D. BEIN, ROBERT E. PULFREY, *Examiners.*